US009228677B2

(12) United States Patent
Hestetun

(10) Patent No.: US 9,228,677 B2
(45) Date of Patent: Jan. 5, 2016

(54) SUBSEA ARRANGEMENT

(71) Applicant: VETCO GRAY SCANDINAVIA.AS, Billingstad (NO)

(72) Inventor: Steinar Hestetun, Billingstad (NO)

(73) Assignee: Vetco Gray Scandinavia.AS, Sandvika (NO)

( * ) Notice: Subject to any disclaimer, the term of this patent is extended or adjusted under 35 U.S.C. 154(b) by 106 days.

(21) Appl. No.: 14/134,077

(22) Filed: Dec. 19, 2013

(65) Prior Publication Data

US 2014/0186120 A1 Jul. 3, 2014

(30) Foreign Application Priority Data

Dec. 27, 2012 (EP) .................................... 12008590

(51) Int. Cl.

| | |
|---|---|
| ***F16L 1/26*** | (2006.01) |
| ***E21B 43/017*** | (2006.01) |
| ***E21B 43/013*** | (2006.01) |
| ***F16L 37/00*** | (2006.01) |
| ***F16L 37/62*** | (2006.01) |
| ***E21B 43/01*** | (2006.01) |

(52) U.S. Cl.

CPC ................. *F16L 1/26* (2013.01); *E21B 43/013* (2013.01); *E21B 43/0107* (2013.01); *E21B 43/017* (2013.01); *F16L 37/002* (2013.01); *F16L 37/62* (2013.01)

(58) Field of Classification Search

USPC ................................................. 405/169, 170

See application file for complete search history.

(56) References Cited

U.S. PATENT DOCUMENTS

| | | | | |
|---|---|---|---|---|
| 3,775,986 | A | 12/1973 | Daughtry | |
| 4,036,295 | A | 7/1977 | Kirkland et al. | |
| 4,695,190 | A * | 9/1987 | Best et al. | 405/169 |
| 4,842,075 | A * | 6/1989 | Kalvenes et al. | 166/341 |
| 5,018,903 | A * | 5/1991 | O'Donnell et al. | 405/170 |
| 8,408,842 | B2 * | 4/2013 | Cafaro et al. | 405/169 |
| 2007/0269270 | A1 * | 11/2007 | Bastesen et al. | 405/170 |
| 2011/0005764 | A1 * | 1/2011 | Bekkevold | F16L 1/26 166/344 |
| 2012/0090152 | A1 * | 4/2012 | White | 29/464 |
| 2013/0136542 | A1 * | 5/2013 | Buchan | 405/184.1 |

FOREIGN PATENT DOCUMENTS

WO 2006134456 A1 12/2006

OTHER PUBLICATIONS

European Search Report dated Apr. 11, 2013 which was issued in connection with EP Patent Application No. 12008590.7 which was filed on Dec. 21, 2012.

* cited by examiner

*Primary Examiner* — David Bagnell
*Assistant Examiner* — Kyle Armstrong
(74) *Attorney, Agent, or Firm* — GE Global Patent Operation

(57) ABSTRACT

A subsea arrangement for connecting an end of a first tubular member to an end of a second tubular member, comprising a base structure, a landing structure which rests on or is configured to be fixed to the base structure using connecting members. The subsea arrangement further comprises a holding structure, to which the end of a tubular member is fixed and which is connectable to the landing structure by being lowered downwards onto the landing structure. The connecting members are configured to give the landing structure a limited movability in a horizontal plane in relation to the base structure so as to allow the landing structure to move horizontally in relation to the base structure and the holding structure, when the landing structure and the holding structure are guided into a correct position in relation to each other.

9 Claims, 5 Drawing Sheets

SUBSEA ARRANGEMENT

BACKGROUND OF THE INVENTION

Embodiments of the present invention relate to a subsea arrangement, and, more particularly, a subsea arrangement to be used for connecting an end of a first tubular member to an end of a second tubular member.

Development within offshore oil and gas exploration in the recent years has been directed to subsea installations for processing and transport of oil and gas. These subsea installations replace the traditional platforms, where oil and gas were transported up to the platform for further processing and transport. This development of subsea production, processing and transport systems has resulted in an increasing need for subsea arrangements for connecting tubular members, such as conduits, to each other at or near the seabed.

SUMMARY OF THE INVENTION

Embodiments of the present invention provide a subsea arrangement configured to connect tubular members to each other.

According to an embodiment of the present invention, there is provided a subsea arrangement. The subsea arrangement comprises: a base structure, which is to rest on the seabed or be mounted to a subsea installation; a landing structure, which rests on the base structure and is fixed to the base structure by means of connecting members; and a first holding structure, to which the end of the first tubular member is to be fixed and which is connectable to the landing structure by being lowered downwards onto the landing structure, the landing structure being provided with a first set of guide members configured to co-operate with corresponding guide members on the first holding structure so as to guide the landing structure and the first holding structure into a correct position in relation to each other when the first holding structure is lowered downwards into contact with the landing structure.

The above-mentioned connecting members are configured to give the landing structure a limited movability in a horizontal plane in relation to the base structure so as to thereby allow the landing structure to move horizontally in relation to the base structure and the first holding structure when the landing structure and the first holding structure are guided into a correct position in relation to each other, under the effect of said first set of guide members on the landing structure and the corresponding guide members on the first holding structure. Thus, the landing structure is free to move somewhat in the horizontal plane under the effect of the forces exerted on the landing structure through these guide members and it is thereby possible to ensure, in a simple manner, that the landing structure and the first holding structure will assume an accurate and predetermined position in relation to each other. Owing to said movability of the landing structure, the landing structure may be accurately and correctly positioned in relation to the first holding structure without any high demands on the tolerances between the mating parts of base structure and the first holding structure.

Further advantages as well as advantageous features of the subsea arrangement of embodiments of the present invention will appear from the following description and the claims.

BRIEF DESCRIPTION OF THE DRAWINGS

With reference to the appended drawings, a specific description of embodiments of the present invention cited as examples follows below.

DETAILED DESCRIPTION OF EXEMPLARY EMBODIMENTS OF THE INVENTION

Figure 1:
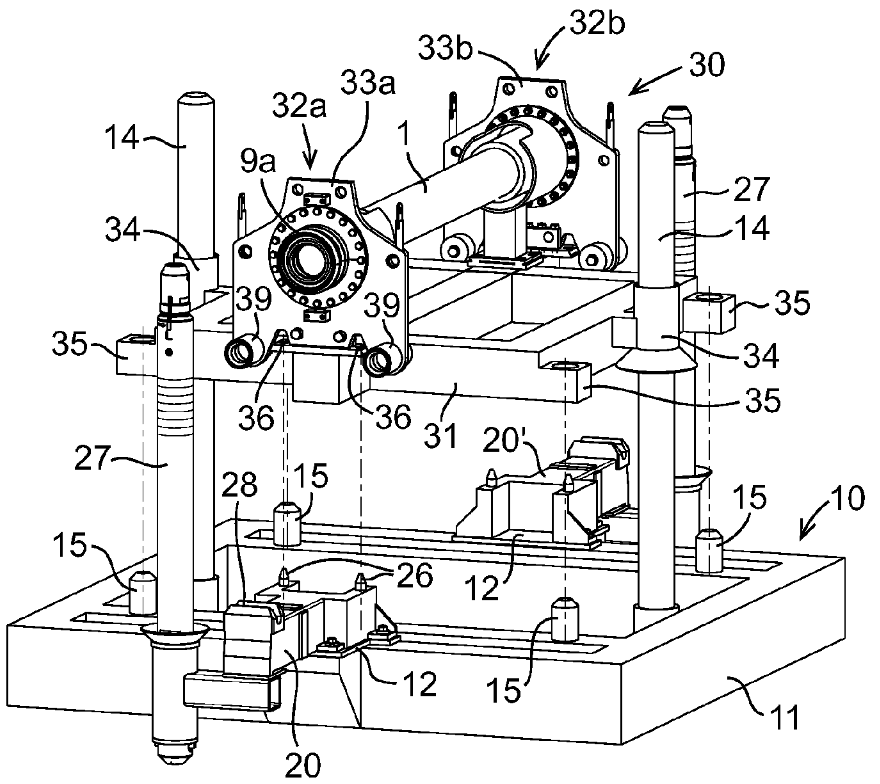
FIG. 1 is a perspective view of a base structure, a first holding structure and landing structures included in a subsea arrangement according to an embodiment of the present invention, as seen with the first holding structure separated from the base structure.

A subsea arrangement according to embodiments of the present invention is illustrated in FIGS. 1-10. The subsea arrangement is configured to be used for connecting an end of a first tubular member 1 to an abutting end of a second tubular member 2 (see FIGS. 8-10). The subsea arrangement comprises: a base structure 10, which is to rest on the seabed or be mounted to a subsea installation, such as a subsea foundation or a Xmas tree flow base; a horizontally extending landing structure 20, which rests on and is fixed to the base structure 10; a first holding structure 30, to which the end of the first tubular member 1 is to be fixed during and after the connection of the two tubular members to each other; and a second holding structure 40 (see FIGS. 8-10), to which the end of the second tubular member 2 is to be fixed during and after the connection of the two tubular members to each other.

The tubular members 1, 2 may for instance be sections of rigid or flexible conduits of single bore or multibore type, such as flow lines, jumpers and umbilicals.

Each holding structure 30, 40 is connectable to the landing structure 20 by being lowered downwards onto the landing structure.

In the illustrated embodiment, the base structure 10 comprises a base frame 11 and two support plates 12 rigidly fixed to the base frame. The landing structure 20 rests on one of the support plates 12.

In the illustrated embodiment, the first holding structure 30 comprises a horizontally extending base frame 31 and first and second holding units 32*a*, 32*b* rigidly connected to the base frame 31 at opposite ends thereof. In this case, the first tubular member 1 extends between the two holding units 32*a*, 32*b* and has a first end section fixed to a holding plate 33*a* included in the first holding unit 32*a* and a second end section fixed to a holding plate 33*b* included in the second holding unit 32*b*. Each holding plate 33*a*, 33*b* is mounted to the base frame 31 and extends in a vertical direction from the base frame. The first holding structure 30 is to be connected to the base structure 10 with the base frame 31 of the first holding structure resting on the base frame 11 of the base structure.

The base structure 10 is provided with guide members 14, 15 configured to co-operate with corresponding guide members 34, 35 on the first holding structure 30 so as to guide the first holding structure 30 into a correct position in relation to the base structure 10 when the first holding structure 30 is lowered downwards into contact with the base structure 10.

In the illustrated embodiment, said guide members on the first holding structure 30 comprise two sleeve-shaped guide members 34, which are mounted to the base frame 31 at opposite sides thereof so as to project horizontally from the base frame 31. Each sleeve-shaped guide member 34 is configured to engage with a guide member in the form of a vertically extending guide post 14 detachably mounted to the base frame 11 of the base structure 10. Each sleeve-shaped guide member 34 is to pass over the top of the associated guide post 14 when the first holding structure 30 is lowered towards the base structure 10 and then slide downwards along the guide post until the base frame 31 of the first holding structure makes contact with the base frame 11 of the base structure.

In the illustrated embodiment, said guide members on the first holding structure 30 also comprise four female-like guide members 35, which are rigidly fixed to the base frame 31 at the corners thereof. Each female-like guide member 35 is configured to engage with a male-like guide member 15 in the form of a vertically extending guide pin, which is rigidly fixed to the base frame 11 of the base structure 10. Each female-like guide member 35 is to pass over the top of the associated male-like guide member 15 when the first holding structure 30 is lowered towards the base structure 10 and then slide downwards along the male-like guide member 15 until the base frame 31 of the first holding structure comes to bear on the base frame 11 of the base structure. As an alternative, the illustrated female-like guide members 35 on the holding structure 30 may of course be substituted by male-like guide members configured to engage with corresponding female-like guide members on the base structure 10.

The landing structure 20 is provided with a first set of guide members 26 configured to co-operate with corresponding guide members 36 on the first holding structure 30 so as to guide the landing structure 20 and the first holding structure 30 into a correct position in relation to each other when the first holding structure 30 is lowered downwards into contact with the landing structure 20. The landing structure 20 is also provided with a second set of guide members 27, 28 configured to co-operate with corresponding guide members 47, 48 (see FIGS. 8-10) on the second holding structure 40 so as to guide the second holding structure 40 into a correct position in relation to the landing structure 20 when the second holding structure 40 is lowered downwards into contact with the landing structure 20.

In the illustrated embodiment, said first set of guide members on the landing structure 20 comprises two male-like guide members 26 in the form of vertically extending guide pins, which are rigidly fixed to the landing structure 20. Each male-like guide member 26 is configured to be received in a hole 37 (see FIG. 7) provided in an associated female-like guide member 36, which is rigidly fixed to the base frame 31 of the first holding structure 30. Each female-like guide member 36 is to pass over the top of the associated male-like guide member 26 when the first holding structure 30 is lowered towards the landing structure 20 and then slide downwards along the male-like guide member 26 until the base frame 31 of the first holding structure comes to bear on the base frame 11 of the base structure. In order to facilitate the engagement between the male-like guide member 26 and the associated female-like guide member 36, the male-like guide member 26 has a conically tapered upper end, whereas the hole 37 of the female-like guide member 36 has a lower part which widens conically downwards. As an alternative, the illustrated male-like guide members 26 on the landing structure 20 may of course be substituted by female-like guide members configured to engage with corresponding male-like guide members on the first holding structure 30.

The guide members 14, 15 on the base structure 10 are configured to come into engagement with the corresponding guide members 34, 35 on the first holding structure 30 before the guide members 26 of said first set of guide members on the landing structure 20 come into engagement with the corresponding guide members 36 on the first holding structure 30, when the first holding structure 30 is lowered downwards into contact with the base structure 10 and the landing structure 20.

The landing structure 20 is fixed to the base structure 10 by means of connecting members 3*a*, 3*b* (see FIGS. 4-6), which are configured to give the landing structure 20 a limited movability in all directions in a horizontal plane in relation to the base structure 10 so as to thereby allow the landing structure 20 to move horizontally in any direction in relation to the base structure 10 and the first holding structure 30, within given limits, when the landing structure 20 and the first holding structure 30 are guided into a correct position in relation to each other under the effect of said first set of guide members 26 on the landing structure 20 and the corresponding guide members 36 on the first holding structure 30.

Figure 6:
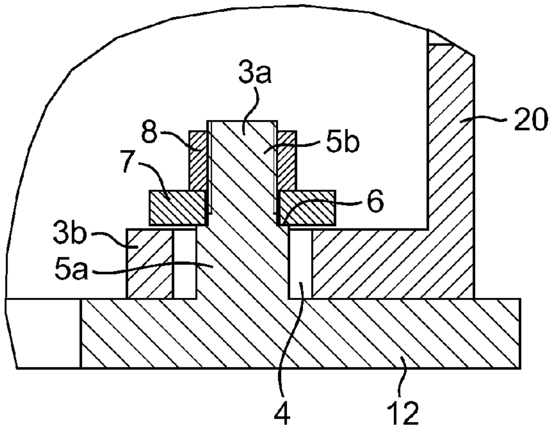
FIG. 6 is a longitudinal section through a connecting member between the landing structure and a part of the base structure according to an embodiment of the present invention.
Figure 7:
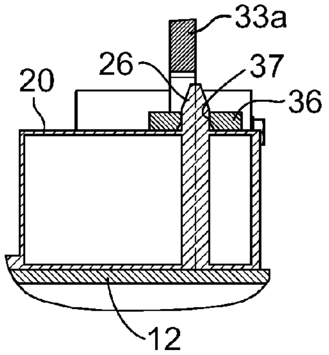
FIG. 7 is a longitudinal section through guide members arranged on a landing structure and the first holding structure of FIGS. 1 and 2.

In the illustrated embodiment, the connecting members 3*a*, 3*b* comprise four pairs of connecting members, each of which consisting of a vertically extending male-like connecting member 3*a*, which is rigidly fixed to the support plate 12 included in the base structure 10, and a corresponding female-like connecting member 3*b*, which is rigidly fixed to the landing structure 20. Each male-like connecting member 3*a* is received with play in a hole 4 provided in the associated female-like connecting member 3*b*, as illustrated in FIG. 6. Each male-like connecting member 3*a* has a smaller diameter than the hole 4 of the associated female-like connecting member 3*b* so as to thereby achieve said play between the male-like connecting member 3*a* and the hole 4. As an alternative, the illustrated male-like connecting members 3*a* on the base structure 10 may of course be substituted by female-like guide members configured to engage with corresponding male-like guide members on the landing structure 20. The number of connecting member pairs may of course be fewer or more than four.

In the illustrated example, each male-like connecting member 3*a* has the form of a pin or bolt, which extends vertically from the support plate 12 and which has a lower unthreaded part 5*a* and an upper part 5*b* provided with an external thread. Said upper part 5*b* has a smaller diameter than the lower part 5*a*, a shoulder 6 being formed between the upper part and the lower part. A washer 7 is fitted onto the upper part 5*b* of the male-like connecting member 3*a* and rests on the shoulder 6. This washer 7 has an external diameter which is larger than the diameter of the hole 4 of the female-like connecting member 3*b*. The washer 7 is secured to the male-like connecting member 3*a* by means of a threaded nut 8, which is screwed onto the upper part 5*b* of the male-like connecting member 3*a*. The lower part 5*a* of the male-like connecting member 3*a* is somewhat longer than the hole 4 of the female-like connecting member 3*b*. Thus, the shoulder 6 is positioned somewhat above the upper opening of the hole 4 and the washer 7 extends radially beyond the rim of the hole 4. The washer 7 limits the movability of the landing structure 20 in relation to the support plate 12 in the vertical direction upwards.

In the illustrated embodiment, the second holding unit 32*b* co-operates with a second landing structure 20', which has the same design as the landing structure 20 described above and which is fixed to the base structure 10 in the same manner as this landing structure 20.

Figure 2:
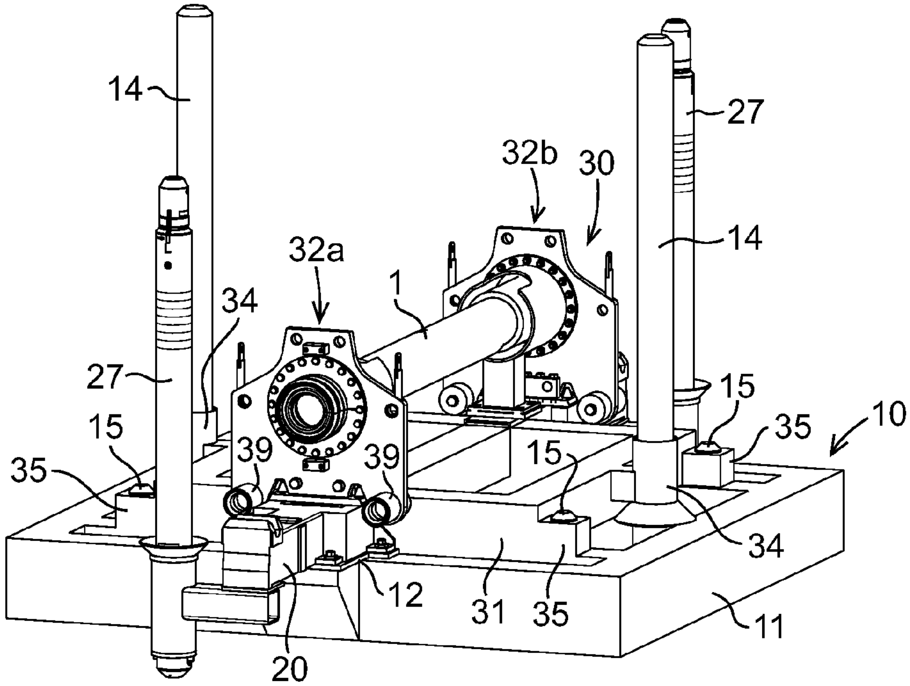
FIG. 2 is a perspective view corresponding to FIG. 1, as seen with the first holding structure connected to the base structure.
Figure 3:
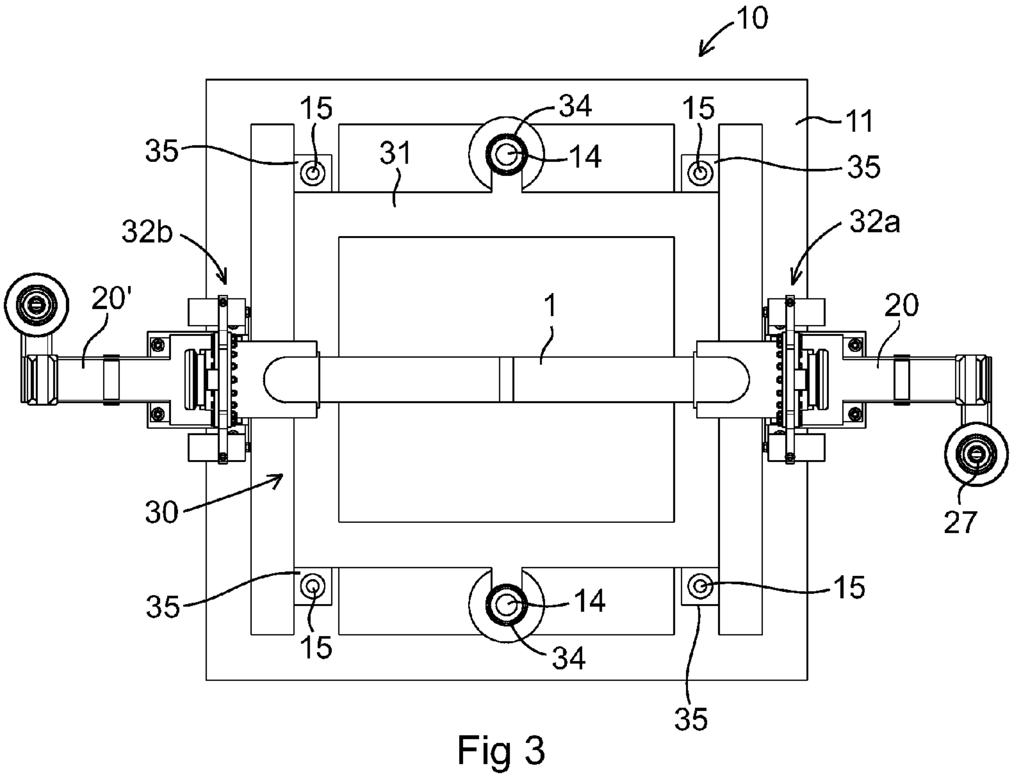
FIG. 3 is a planar view from above the base structure, and illustrates the first holding structure and landing structures of FIG. 2.
Figure 4:
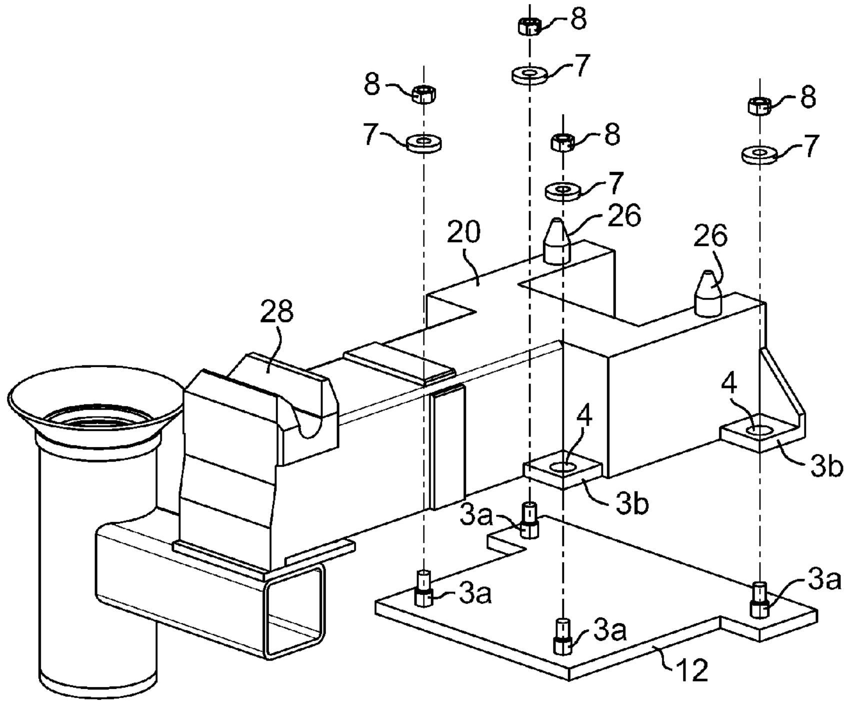
FIG. 4 is an exploded view of a landing structure and associated connecting members for connecting the landing structure to the base structure according to an embodiment of the present invention.
Figure 5:
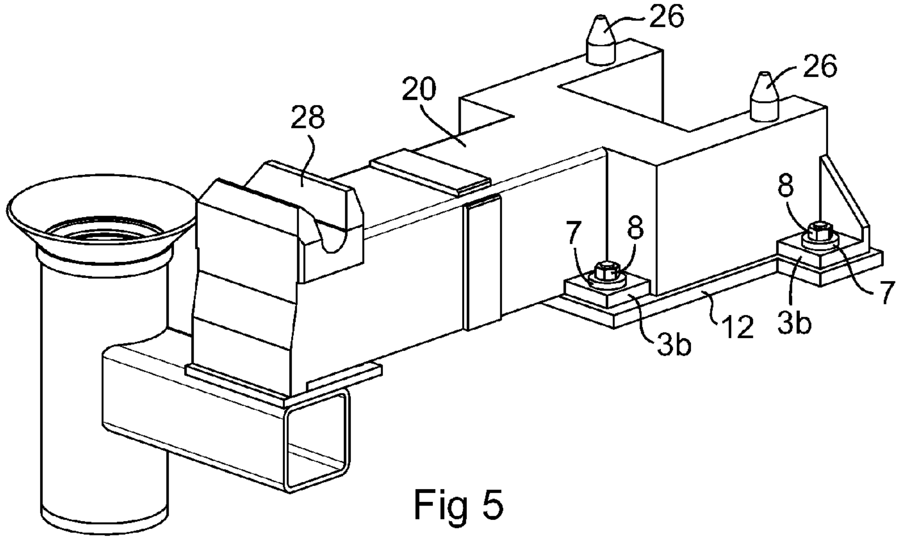
FIG. 5 is a perspective view of the landing structure fixed to a part of the base structure according to an embodiment of the present invention.

A stage during the connection of the first holding structure 30 to the base structure 10 and the landing structures 20, 20' is illustrated in FIG. 1. The first tubular member 1 is secured to the holding units 32*a*, 32*b* of the holding structure 30 before the holding structure is lowered into the sea. The holding structure 30 is lowered into the sea, e.g. from a surface vessel, while hanging in a crane hook of a hoisting device through lifting wires (not shown) attached to the holding structure 30. Guide lines (not shown) attached to the upper ends of the guide posts 14 of the base structure 10 will assist the guiding to ensure that the sleeve-shaped guide members 34 of the holding structure 30 will be properly engaged with the guide posts 14, as illustrated in FIG. 1. The holding structure 30 is lowered further downwards while being guided along the guide posts 14 until the guide members 35 on the holding structure 30 come into engagement with the corresponding guide members 15 on the base structure 10. The holding structure 30 is then lowered further downwards while being guided along the guide members 15 until the guide members 36 on the holding structure 30 come into engagement with the corresponding guide members 26 on the landing structures 20, 20' and until the base frame 31 of the holding structure 30 comes to bear on the base frame 11 of the base structure 10, as illustrated in FIG. 2. When the last-mentioned guide members 36 on the holding structure 30 move downwards along the corresponding guide members 26 on the landing structures 20, 20', each landing structure 20, 20' is free to move somewhat in the horizontal plane under the effect of the forces exerted on the landing structure 20, 20' through these guide members 36, 26 and it is thereby ensured that the landing structure 20, 20' and the holding structure 30 will assume an accurate and predetermined position in relation to each other. When the holding structure 30 has been landed onto the base structure 10, the guide posts 14 may be released from the base structure 10 and retrieved to the surface vessel.

The second holding structure 40 comprises a base unit 41 and a sliding unit 42, which is slidably mounted to the base unit 41. An end section of the second tubular member 2 is to be fixed to the sliding unit 42. A stroking device 43 in the form of a hydraulic cylinder is configured to act between the base unit 41 and the sliding unit 42. The sliding unit 42 and the end section of the second tubular member 2 can be pushed axially forwards in relation to the base unit 41 by means of the stroking device 43. The base unit 41 comprises a lower base frame 44 and a support sleeve 45 mounted to the base frame 44, whereas the sliding unit 42 comprises a tubular body 46. The tubular body 46 is configured to surround the end section of the second tubular member 2 and is displaceably received in said support sleeve 45. The tubular body 46 extends through the support sleeve 45 and is axially displaceable in relation to the support sleeve 45 by means of the stroking device 43. The end section of the second tubular member 2 extends through and is fixed to the tubular body 46. Thus, the end section of the second tubular member 2 will be axially displaced together with the tubular body 46 when the tubular body is displaced in relation to the support sleeve 45.

The base unit 41 of the second holding structure 40 is connectable to the landing structure 20 by being lowered downwards onto the landing structure so as to come to bear against it. Thus, the landing structure 20 constitutes a landing platform for the second holding structure 40. The base unit 41 of the second holding structure 40 is provided with guide members 47, 48 configured to co-operate with corresponding guide members 27, 28 on the landing structure 20 so as to guide the second holding structure 40 into a correct position in relation to the landing structure 20 when the holding structure 40 is lowered downwards into contact with the landing structure 20.

In the illustrated embodiment, said guide members of the base unit 41 comprise a ring-shaped guide member 47, which is mounted to the base unit 41 so as to project in a horizontal direction therefrom. This guide member 47 is configured to engage with a guide member in the form of a vertically extending guide post 27 detachably mounted to the landing structure 20. The guide member 47 is to pass over the top of the guide post 27 when the second holding structure 40 is lowered towards the landing structure 20 and then slide downwards along the guide post until the base unit 41 of the holding structure 40 makes contact with the landing structure 20.

In the illustrated embodiment, said guide members of the base unit 41 further comprise an elongated and horizontally extending guide member in the form of a guide rod 48, which extends perpendicularly to the longitudinal axis of the base unit 41. This guide rod 48 is mounted to the lower base frame 44 of the base unit 41 on the underside thereof and is configured to come into engagement with a corresponding elongated and horizontally extending guide member in the form of a guide groove 28 on the landing structure 20 when the base unit 41 of the second holding structure 40 is lowered downwards into contact with the landing structure 20. The guide groove 28 is arranged on the upper side of the landing structure 20 and has an upwardly directed opening, through which the guide rod 48 may pass into the guide groove 28.

The first and second holding structures 30, 40 are provided with corresponding alignment members 39, 49, which are configured to come into contact with each other in order to align the end section of the second tubular member 2 with the end section of the first tubular member 1 when the sliding unit 42 and the end section of the second tubular member 2 are pushed forwards in relation to the base unit 41 by means of the stroking device 43.

A connecting device 50, for instance in the form of a clamp connector, is provided for clamping together a hub 9*a* arranged on the end section of the first tubular member 1 and a corresponding hub 9*b* arranged on the end section of the second tubular member 2 in order to form a fluid-tight connection between the two tubular members. In the illustrated example, the connecting device 50 is attached to the sliding unit 42 in order to be displaced towards the end section of the first tubular member 1 when the sliding unit 42 and the end section of the second tubular member 2 are pushed forwards in relation to the base unit 41 by means of the stroking device 43.

Different steps in a process of connecting an end section of a first tubular member 1 to an end section of a second tubular member 2 by means of a subsea arrangement comprising holding structures 30, 40 and a landing structure 20 of the types described above are illustrated in FIG. 8-10.

Figure 8:
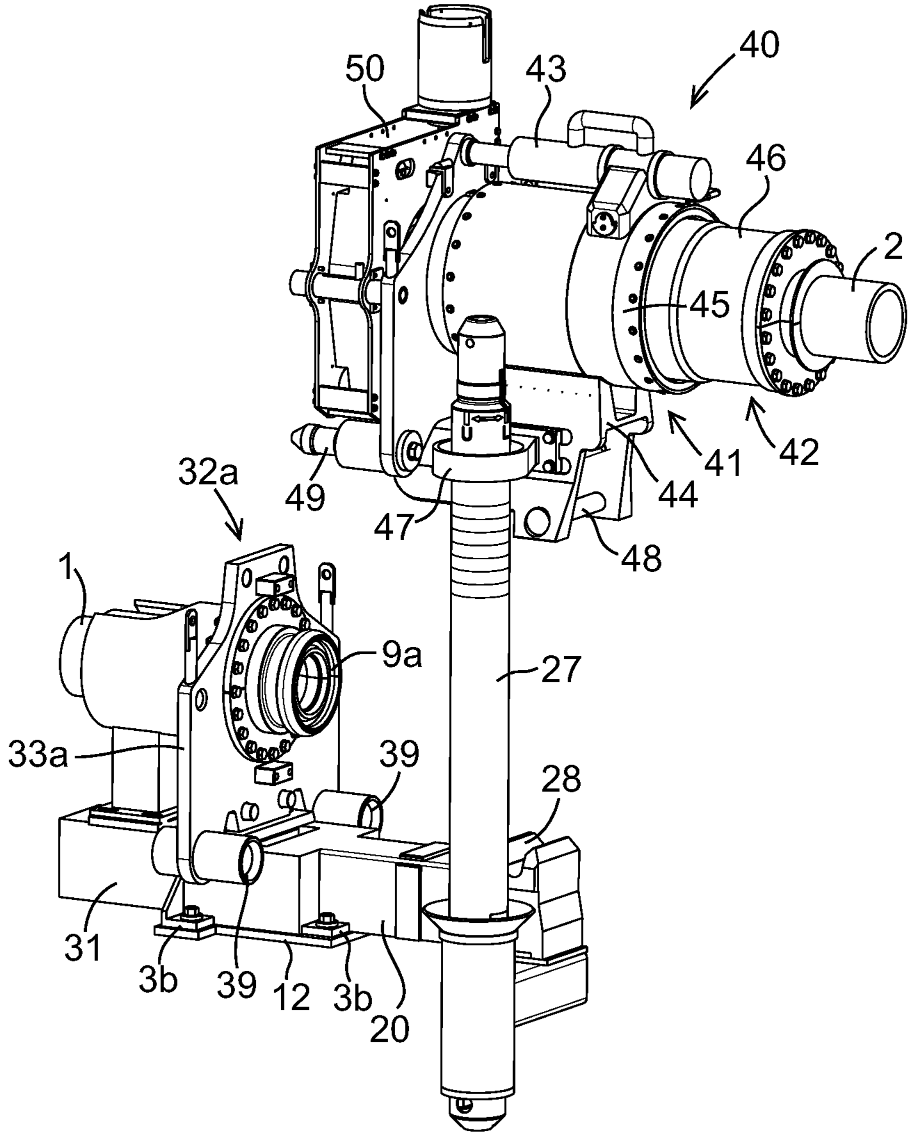
FIGS. 8, 9, and 10 are perspective views illustrating different steps in a process of connecting the end sections of two conduits to each other by means of a subsea arrangement according to an embodiment of the present invention.
Figure 9:
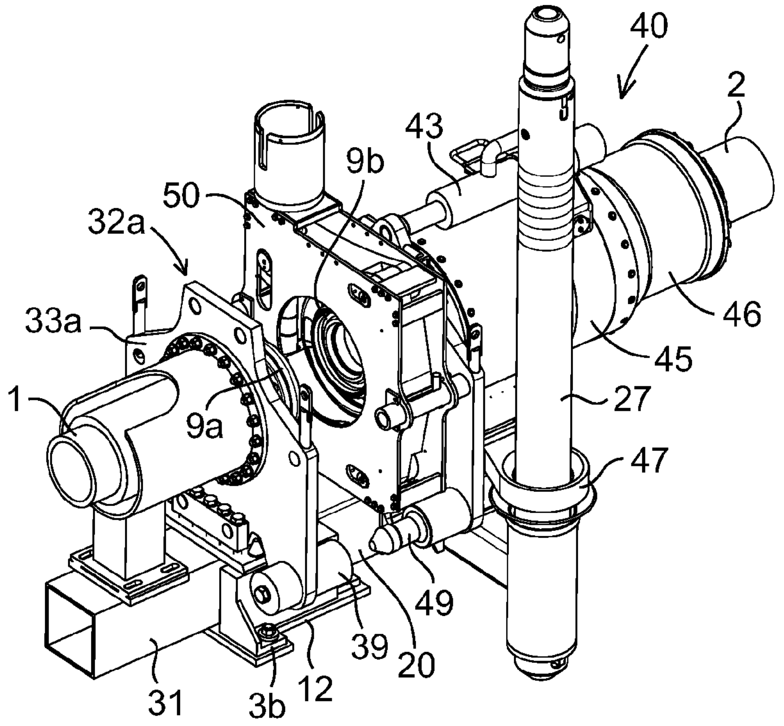
Figure 10:
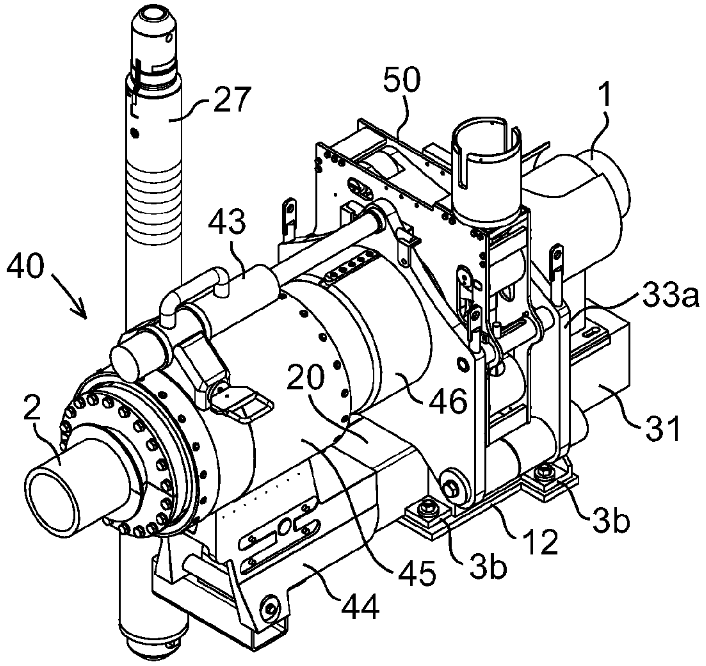

The connecting device 50 and the end section of the second tubular member 2 are secured to the sliding unit 42 of the second holding structure 40 before this holding structure is lowered into the sea. The second holding structure 40 is lowered into the sea, e.g. from a surface vessel, while hanging in a crane hook of a hoisting device through lifting wires (not shown) attached to the holding structure 40. A guide line (not shown) attached to the upper end of the guide post 27 of the landing structure 20 will assist the guiding to ensure that the ring-shaped guide member 47 of the holding structure 40 will be properly engaged with the guide post 27, as illustrated in FIG. 8. The holding structure 40 is lowered further downwards while being guided along the guide post 27 until the guide member 48 on the lower base frame 44 of the holding structure 40 comes into engagement with the corresponding guide member 28 on the landing structure 20 and until the base frame 44 comes to bear against the landing structure 20, as illustrated in FIG. 9. The stroking device 43 is then actuated to push the sliding unit 42 forwards in relation to the base unit 41 so to move the end section of the second tubular member 2 and the connecting device 50 from the position illustrated in FIG. 9 to the position illustrated in FIG. 10. The hub 9*b* of the second tubular member 2 is thereby brought into contact with the hub 9*a* of the first tubular member 1. A remotely operated torque tool (not shown), which is detachably mounted to the connecting device 50, is then operated to actuate the connecting device 50 so as to clamp together said hubs 9*a*, 9*b*. The stroking device 43 may then be retrieved to the surface vessel together with the torque tool and the guide post 27.

The present invention is of course not in any way restricted to the embodiments described above. On the contrary, many possibilities to modifications thereof will be apparent to a person with ordinary skill in the art without departing from the basic idea of the present invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A subsea arrangement for connecting an end of a first tubular member to an end of a second tabular member, the subsea arrangement comprising:

a base structure on a seabed or mounted to a subsea installation;

a landing structure fixed to the base structure by connecting members; and a first holding structure, wherein the end of the first tubular member is fixed to the first holding structure, and the first holding structure is connectable to the landing structure by being lowered downwards onto the landing structure, wherein the landing structure comprises a first set of guide members configured to co-operate with corresponding guide members on the first holding structure to guide the landing structure and the first holding structure into a correct position in relation to each other when the first holding structure is lowered downwards to be in contact with the landing structure, wherein the connecting members are configured to give the landing structure a limited movability in a horizontal plane in relation to the base structure to allow the landing structure to move horizontally in relation to the base structure and the first holding structure when the landing structure and the first holding structure are guided into a correct position in relation to each other under the effect of the first set of guide members on the landing structure and the corresponding guide members on the first holding structure, and wherein the base structure comprises guide members, wherein the base structure guide members are configured to co-operate with corresponding guide members on the first holding structure to guide the first holding structure into a correct position in relation to the base structure when the first holding structure is lowered downwards to be in contact with the base structure, and to come into engagement with the said corresponding guide members on the first holding structure before the guide members of the first set of guide members on the landing structure come into engagement with the corresponding guide members on the first holding structure, when the first holding structure is lowered downwards to be in contact with the base structure and the landing structure.

2. The subsea arrangement according to claim 1, wherein the connecting members comprise at least one pair of connecting members comprising:

a vertically extending male-like connecting member rigidly fixed to one of the base structure and the landing structure; and a corresponding female-like connecting member rigidly fixed to the other one of the base structure and the landing structure, wherein the male-like connecting member is received with play in the female-like connecting member.

3. The subsea arrangement according to claim 2, wherein the male-like connecting member is fixed to the base structure and the female-like connecting member is fixed to the landing structure.

4. The subsea arrangement according to claim 3, wherein the male-like connecting member has the form of a pin or bolt, and the female-like connecting member is provided with a hole configured to receive the male-like connecting member with play.

5. The subsea arrangement according to claim 4, wherein the connecting members comprise at least two pairs of connecting members.

6. The subsea arrangement according to claim 5, further comprising a second holding structure, wherein the end of the second tubular member is fixed to the second holding structure, and the second holding structure is connectable to the landing structure by being lowered downwards onto the landing structure, wherein the landing structure comprises a second set of guide members, configured to co-operate with corresponding guide members on the second holding structure to guide the second holding structure into a correct position in relation to the landing structure when the second holding structure is lowered downwards to be in contact with the landing structure.

7. The subsea arrangement according to claim 2, wherein the male-like connecting member comprises a pin or bolt, and the female-like connecting member comprises a hole configured to receive the male-like connecting member with play.

8. The subsea arrangement according to claim 2, wherein the connecting members comprise at least two pairs of connecting members.

9. The subsea arrangement according to claim 1, further comprising a second holding structure, wherein the end of the second tubular member is fixed to the second holding structure, and the second holding structure is connectable to the landing structure by being lowered downwards onto the landing structure, the landing structure comprising a second set of guide members configured to co-operate with corresponding guide members on the second holding structure to guide the second holding structure into a correct position in relation to the landing structure when the second holding structure is lowered downwards to be in contact with the landing structure.

* * * * *